(No Model.)
R. OWEN.
AGRICULTURAL IMPLEMENT.
No. 401,297. Patented Apr. 9, 1889.
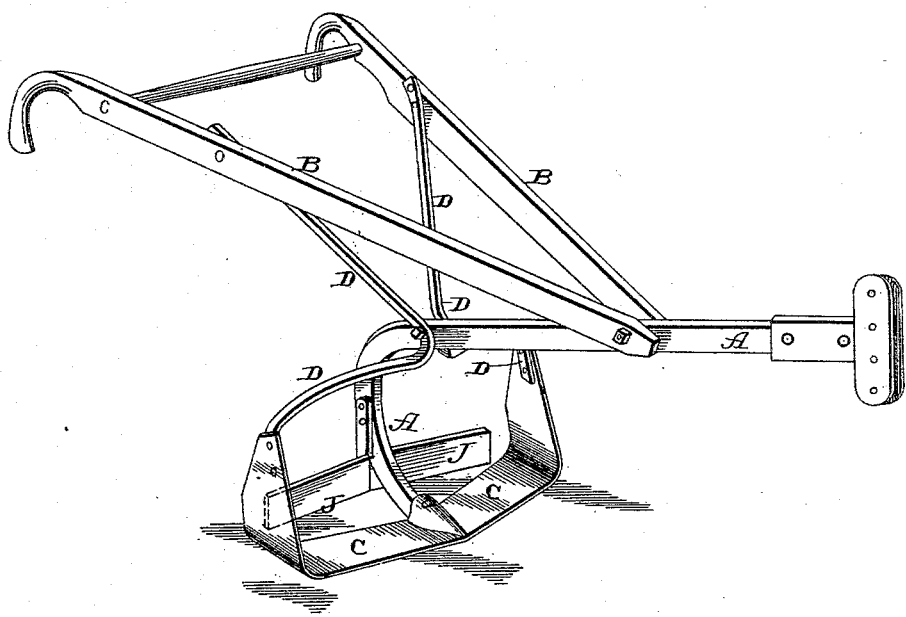
Witnesses:
E. P. Ellis,
L. L. Burket,
Inventor:
Robert Owen,
per F. A. Lehmann
Atty.

UNITED STATES PATENT OFFICE.

ROBERT OWEN, OF PADUCAH, KENTUCKY.

AGRICULTURAL IMPLEMENT.

SPECIFICATION forming part of Letters Patent No. 401,297, dated April 9, 1889.

Application filed November 23, 1888. Serial No. 291,657. (No model.)

*To all whom it may concern:*

Be it known that I, ROBERT OWEN, of Paducah, in the county of McCracken and State of Kentucky, have invented certain new and useful Improvements in Agricultural Implements; and I do hereby declare the following to be a full, clear, and exact description of the invention, such as will enable others skilled in the art to which it pertains to make and use it, reference being had to the accompanying drawing, which forms part of this specification.

My invention relates to an improvement in agricultural implements; and it consists in the combination, with the plow-beam, of a horizontal cutter which is applied to the lower end of the beam and suitably braced in position, and which cutter extends beyond both sides of the beam, as will be more fully described hereinafter.

The object of my invention is to provide an attachment for plow and cultivator beams, by means of which weeds can be cut off at any desired distance below the surface of the ground, and then the weeds thus cut off raked, so as to free their ends from the earth.

The accompanying drawing represents a perspective of an implement which embodies my invention.

A represents an ordinary bent metallic plow or cultivator beam, to which the handles B are applied in the usual manner. Bolted to the lower end of the beam is the horizontal cutter C, which has its ends turned up and rigidly secured to the braces D, which are bolted at or near their centers to opposite sides of the beam A and connected to the handles at their upper ends. These braces serve to strengthen and steady the cutter rigidly in position while in operation. The central portion of the cutter extends any suitable distance in advance of the lower end of the beam, and the cutter projects any suitable distance beyond each side of the beam that may be desired. As the implement is drawn along, this cutter is made to cut any desired distance below the surface of the ground, and thus cut off the weeds and displace them, so that they will not again take root.

Secured to the beam in the rear of the cutter is a scraper or rake, I, of any suitable description, and which is intended to follow behind the cutter and displace the weeds and grass which have been loosened, so as to prevent all possibility of their again taking root. This scraper is made vertically adjustable upon the beam, so as to adapt itself to the depth at which the cutter is running, and, following behind, it displaces all of the weeds and grass which are loosened by the cutter. The cutter can be made of any desired length and width and may be made more or less pointed at its center, or perfectly straight, as may be desired.

Having thus described my invention, I claim—

The combination of the bent beam, the cutter having upturned ends and secured at its center to the lower end of the beam, the braces D, bolted to the beam at or near their centers and having their ends secured to the ends of the cutter and to the handles, and the handles supported at their rear ends by the braces, substantially as shown.

In testimony whereof I affix my signature in presence of two witnesses.

ROBERT OWEN.

Witnesses:
J. S. REINHART,
S. B. HUGHES.